Jan. 4, 1966     W. D. CRAM     3,227,250
DISCONNECTIBLE PIVOT JOINTS FOR MACHINE CONSTRUCTION
Filed April 2, 1962
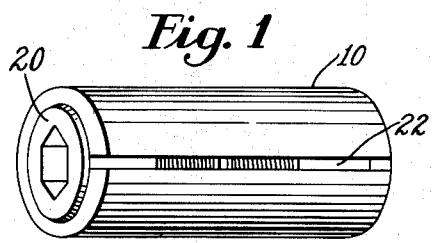
Fig. 1
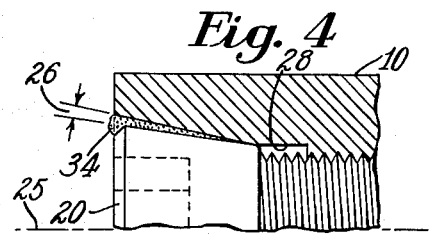
Fig. 4
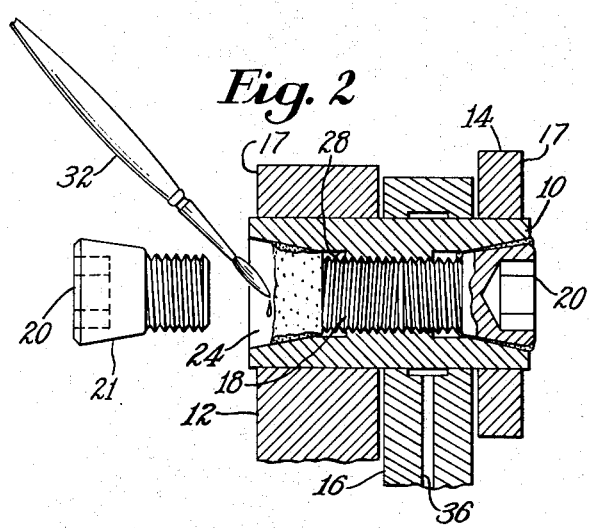
Fig. 2
Fig. 3
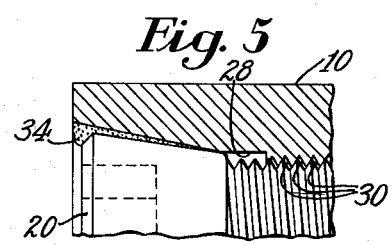
Fig. 5
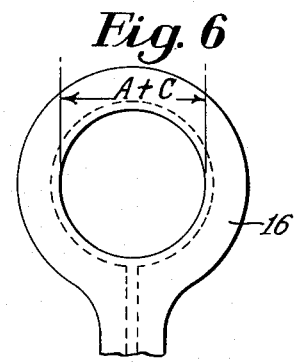
Fig. 6
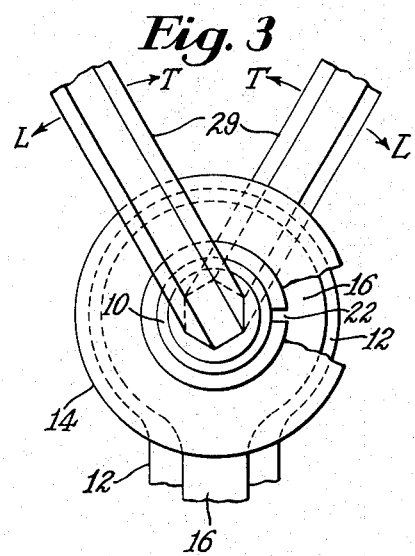
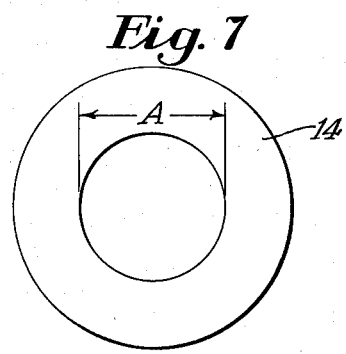
Fig. 7
*Inventor*
William D. Cram
By his Attorney
Edward W Fearing

United States Patent Office 3,227,250
Patented Jan. 4, 1966

3,227,250
DISCONNECTIBLE PIVOT JOINTS FOR
MACHINE CONSTRUCTION
William D. Cram, Beverly, Mass., assignor to United
Shoe Machinery Corporation, Boston, Mass., a corporation of New Jersey
Filed Apr. 2, 1962, Ser. No. 184,196
7 Claims. (Cl. 189—36)

This invention relates to readily disconnectible pivot connections for machine constructions capable of reassembly without replacement of parts and more particularly to expansible machine studs of relatively simple and inexpensive nature by means of which two or more machine elements may be pivoted together securely without danger of displacement, enabling simplification in design work involving light-weight, rapidly moving and highly stressed machinery.

Heretofore, the use of dowels for fastening machine elements has been implemented by studs and bolts mounted in holes in the elements to be connected together. For light-weight, high-speed operation under heavy stress all studs or bolts must be ground accurately to size for receiving holes reamed accurately to bring about the required type of precision fit in accordance with the service to be rendered. Types of precision fit generally have been classified as Press, Drive, Close and Running and, for extremely rigid connections, a Shrink Fit is employed by heating an external part and cooling a cooperating internal part. Such fits have accomplished the most secure form of unthreaded gripping connection known. To insure proper tolerance limits with such fits carefully made gages ordinarily are employed, so that machines can be built reliably with uniform results.

The principal present difficulty in constructing machines in the manner noted is met when it is necessary to disassemble and reassemble the individual relatively movable elements because of the possibility that the machine parts surrounding the pivot studs will be damaged or broken from the application of heavy forces necessary to overcome inherent frictional engagements between them. Such disassembly and reassembly may be doubly inconvenient and difficult in locations where machines are most frequently used unless special expensive machine tools are available.

Numerous attempts have been made heretofore to provide pivot studs which may be introduced into a machine with at least the same degree of effectiveness and reliability, while maintaining a light weight construction equal to that afforded with a selective system using precision fit studs between the parts, but the problem of disassembly and reassembly has remained complicated, not only by possibility of damage or breakage in the parts, but also by structural failure or lack of uniform security in other respects.

An object of the present invention is to provide a machine construction employing pivot studs fixed securely in openings within machine parts, reliably and uniformly in a manner obtainable in the past only by a selective precision fit system without encountering the necessity of replacing parts as the result of damage by breakage during disassembly or other practical drawbacks.

A further object is to provide an expansible precision stud for pivotally fastening together machine elements formed with openings, within at least one of which the stud is capable of being expanded with a force at least equal to that obtainable with a shrink fit stud.

In accordance with the present invention two or more machine elements have formed in them openings for a cylindrical pivot stud mechanically expanded with internal support along its external surface between the limits defined by the planes of the outside exposed faces of the machine elements, the stud otherwise requiring a lower degree of accuracy in its dimensions than required in a shrink fit stud of previous construction, inserted under a precision fit system. The preferred pivot stud has an axially threaded bore slitted through its external surface to enable expansion in diameter, the expanding means being a screw having a conical head to form a single ring of contact with the bore in the stud within limits between planes defined by the outside faces of the machine elements, the larger diameter of which head is exposed at one end of the stud and a straight threaded portion at the other end of which screw is engaged along identical successive rings of helical contact with the threaded bore, the conical head being exposed for access at the end of the stud outside and beyond the threaded portion of the bore to cause the screw when turned into the stud to wedge apart the edges of the slit in the stud while subjecting the screw to tension between its threaded end and its conical head. Under these circumstances, as the edges of the slit in the stud are wedged apart the threaded portion of the bore in the stud engaged by contact rings on the screw becomes enlarged in diameter, so that the manner of engagement between the threads in the stud and on the screw changes to accommodate the increase in diameter and accordingly provides uniform support throughout the length of the screw threads as the outer diameter of the stud along the threaded portion engaged by the screw increases. In this feature of the invention, a pivot stud may be provided with two screws entering its ends and the ends of the screws may be permitted to approach into such close proximity with each other, that the full length of the stud is supported adequately in its enlarged and expanded condition. In this way the resistance of the stud to bending stress throughout its entire length while being compressed diametrically or otherwise sprung out of shape objectionably is increased.

These and other features of the invention, as hereinafter described and claimed, will readily be apparent to those skilled in the art from the following detailed specification taken in connection with the accompanying drawings, in which:

FIG. 1 is a perspective view on an enlarged scale of an expansible machine stud embodying the features of the present invention;

FIG. 2 is a sectional detail view of a pivot connection joint in a machine employing the stud illustrated in FIG. 1;

FIG. 3 is a side view of the pivot connection joint shown in FIG. 2, illustrating the manner in which the stud of the invention is secured in place or loosened to disassemble the joint;

FIG. 4 is an enlarged sectional view of the stud, indicating a portion of the stud as it is about to be expanded;

FIG. 5 is a sectional view of a portion of the same stud after having been expanded;

FIG. 6 is a detail view of a machine bearing element surrounding the stud; and

FIG. 7 is a similar detail view of a machine restraining element within which the stud is fastened.

In the design and manner of construction for a light-weight, high-speed and highly stressed machine, the problems of clearances and of mass in the moving parts are of prime importance.

Besides clearances and mass many other factors also must be taken into consideration, as will be indicated hereinafter. For these reasons it is essential not only to maintain minimum space requirements for parts utilized in securing machine elements together but also to permit convenient disassembly and reassembly. The simplicity of the fastening means used and the ease and effectiveness of its construction and design also can not be overlooked. Furthermore, the disassembly and reassembly of the machine elements must not require application of such forces on the pivoting means as to damage or rupture the machine elements themselves.

In compliance with these requirements the external surface of the pivot stud in the present invention consists entirely of a hollow cylindrical form which lends itself to construction by rolling a flat sheet of material to bring its opposite edges together while being capable of expansion uniformly throughout its length by opening up a single slit between its edges. When the pin is expanded it is given uniform internal support along its length against compression radially, the forces exerted during the operation of the machine being resisted against collapse of the stud to the same extent within the rotatable element as within the mounting element to avoid subjecting any portion of its length to unusual or concentrated strain and the bearing between the stud and the rotatable element being maintained with a predetermined clearance.

The subject stud also is useful in many applications without requiring any increase in dimensions of the parts fastened together and needs only to have available the space about its ends for the purpose of expanding or contracting the external dimensions of the stud. Thus, there is no requirement for increased dimensions in the parts to be fastened together, all of the fastenings and securement being attained by the stud rather than by special surrounding construction.

Referring more particularly to the drawings, the illustration of FIG. 2 indicates one of the many possible applications for a smooth surfaced stud fastening having a pivot connection joint, one element of which has an opening to form a mounting gripped by the stud, another element of which has a similar opening to provide resistance constraining endwise thrust and the third pivoted element of which has a circular bearing intermediate the first two but of larger diameter to form a rotatable mounting on the central part of the stud with a clearance capable of exact predetermination.

As illustrated in FIG. 1 the stud is either rolled or machined from seamless tubular stock and comprises a shell 10 having suitable heat treatment to emphasize durability under conditions of abrasion as well as to permit resilient expansion in diameter. The gripped mounting element, indicated at 12, in FIGS. 2 and 3, is provided with a smoothly finished hole, a few thousandths of an inch larger in diameter than the outside of the contracted stud 10. The constraining element, in the form of a heavy washer 14, is also constructed with a finished opening a few thousandths of an inch larger than the outside diameter of the stud, so that it may slide easily into the opening before the stud is expanded. On the central portion of the stud between the mounting and constraining elements 12 and 14 there is rotatable the pivoted element, indicated at 16, the bearing diameter in the pivoted element being at least as large as that of the openings in the mounting and constraining elements. For instance, if a dimension of A indicates the diameter of openings in the mounting and constraining elements, that in the pivoted element 16, as shown in FIG. 6, is of an equal diameter plus an exact, predetermined clearance C for the bearing in the rotatable element, so that the rotatable element may pivot freely on the stud. In this way the clearance C is determined by the difference between the opening diameters in the mounting and pivoted members, rather than simply by reaming the opening in the pivoted member larger than the stud.

The shell 10 of the stud throughout its length has its outer surface precision ground to a uniform diameter determined by the mechanical requirements of the machine, and forms an externally finished cylindrical surface for the bearing portion of the rotatable element. Along its central portion, at least within limits formed between planes defined by the outside exposed faces 17 (FIG. 2) of the machine elements, the stud is machined to provide an internal threaded bore 18 (FIG. 2) extending axially of the stud. Where a single mounting element is used the threaded portion of the bore need not extend into the restraining element but is located, as shown in FIG. 2, to extend only into the mounting element 12. If two mounting elements are used the stud should be positioned with its threaded portion extending into both. For convenience in machining, the complete central length of the stud is threaded with a single pass of a tap. Thus, a single screw only may be used.

The slit between the edge portions of the stud preferably extends radially through the external finished surface and the central threaded bore of the stud to enable easy expansion diametrically against the walls of the openings in the outer elements of the joint.

For the purpose of expanding the illustrated stud into gripping engagement with the mounting and constraining elements there is inserted in the end engaged by the mounting element 12, a screw 20 having a conical head 21, the larger diameter of which is exposed at one end of the stud for convenient access to the screw. The thread on the screw and within the stud is of uniform diameter and is formed with the usual standard 60° angle to provide successive helical rings of contact with the threaded portion of the stud bore. The conical head of the screw engages within an outer end of the stud in axially spaced relation to the threaded portion of the bore but provides a single ring of contact with the stud also within the planes defined by the exposed faces 17. The screw when turned into the stud is tensioned between the conical head and the threaded portion by engagement with the stud, thereby wedging uniformly apart the parallel edges of the slit, shown at 22, in the shell 10. The wedging action of the screw thus increases the diameter of the stud and expands its outside surface securely into gripping engagement with the internal surfaces of the mounting and constraining elements, one screw acting for each.

In the construction illustrated the stud at either end is machined with an internal conical recess 24 (see FIG. 2), against which the conical head of a screw presses and to prevent formation of a ring of contact outside the limits of the machine elements the conical angle of the screw head between the axis 25 (FIG. 4) of the stud and the screw head is made less than that between the surface of the recess 24 and the axis 25, so that a triangular space 26 (FIG. 4) is formed between the screw head and the inner surface of the stud. The difference in angle shown is small and may be reduced where precision work is required to approximately two or three degrees. The purpose for this angular difference is two-fold and will be discussed more fully.

As a further convenience in manufacture, the internal conical recess 24 and the threaded portion 18 of the stud have interposed between them a short straight counterbore 28, thus avoiding the necessity of accurately threading the screw fully to a line where the conical head begins.

To insure uniform expansion of the stud throughout its length especially where the length is several times the diameter both ends of the stud are similarly machined to receive two individual screws 20. The use of a screw in each end of the stud has the further advantage that in expanding a stud the screws are turned in opposite directions, thus avoiding the necessity of gripping and disturbing the finish on the outside of the stud when tightening a joint, a better application of forces being possible by using two wrenches 29 as in FIG. 3. During the stud expanding process, where the screws are formed in their heads with hexagonal openings for use with Allen wrenches, the wrenches may be turned simultaneously in opposite directions, as indicated by the arrows TT in FIG. 3, or to loosen the studs the screws are turned simultaneously in the directions of the arrows LL, the stud being thereby permitted to contract. In this way the force applied to one wrench is offset by the force applied to the other and smaller torsional forces are required to be applied to the separate elements of the joint.

By utilizing a conically headed screw with separate head and threaded portions to expand the stud, the stud not only is expanded more uniformly throughout its length than otherwise would be possible, but also the stud is supported against any concentrated forces applied externally tending to collapse the stud or to injure the structure of the stud shell 10. Also, because the screw is subjected to lengthwise tension the stud becomes prestressed by compression in a lengthwise direction, thus utilizing to the greatest possible extent the resistance of the stud to flexure against shear and bending forces, according to known engineering principles. A further benefit also is obtained by this construction in that the threaded portion of the stud being supported throughout its full length. If two screws are employed, with their threaded ends brought into close proximity with each other, the stud is then reinforced materially against collapse in its enlarged and expanded condition, so that minimum distortion is permitted and the greatest possible amount of rigidity is afforded for the amount of metal employed in the stud.

As will be seen by reference to FIGS. 4 and 5, when a screw 20 is inserted within one end of the shell 10, the threaded portion of the screw enters into full engagement with the threaded portion of the shell, so that both angular surfaces of each thread form identical successive double rings of contact with the stud. When the screw is turned still further to expand the stud shell the manner of engagement of the threads is changed, only a single series of identical rings of contact between the screw 20 and the threaded portion of the stud occurring. Under these conditions there is a helical space 30 formed between the two parts, as shown in FIG. 5. In this way the successive thread rings remaining still in contact with the stud produce a full uniform support throughout the length of the threaded portion between the limits of the exposed faces 17 on the machine elements 12 and 14.

By providing a triangular space 26 between the outer end of the screw head and the inner conical surface 24 of the stud, the screw is brought with certainty into engagement with the internal bore of the stud shell between the outside exposed faces 17 of the members 12 and 14, as shown in FIGS. 4 and 5, where the single ring of contact about the smaller diameter portion of the head is adequately spaced from the end of the stud, so that the forces exerted by friction between the screw head and the shell will impart less rotational resistance to the screw than if the points of engagement were concentrated at the outer, larger diameter ends of the conical recesses 24 in the shell. Thus, when it is desired to dismantle the machine it is easier to remove the screws from the studs and the studs from the machine because in this way there is less likelihood that the studs will become permanently flared at their ends.

To assist still further in the operation of removing the screws from the shell of the stud it may be desirable to apply solidified lubricating and corrosion inhibiting material such as a Teflon varnish before the screws are inserted. For this purpose the surfaces of the stud or the screw may be painted with such material by the use of a brush 32, as shown in FIG. 2. After insertion of the screw and tightening to expand the stud shell the Teflon varnish will be spread by compression throughout the triangular space 26 and most likely a surplus of the varnish will be forced out of the space to form a ridge 34, as in FIGS. 4 and 5. This ridge is effective in partially sealing the structure to prevent entry of corrosive materials, and due to the nature of the Teflon, a lubricating effect will be produced if an attempt is made to remove the screw.

For the purpose of lubricating the pivoted element 16 it may be provided with a force-feed lubricating duct 36 (FIG. 2), which will assist in filling the void spaces in the silt 22 of the stud shell, as well as any space existing between the stud and the threaded ends of the screws 20. The use of lubricant in this way also assists further in removal of the screws while dismantling the machine.

In place of the Teflon varnish for facilitating removal of the screws it has been found that a molybdenum disulfide film between the screw and the internal surfaces of the stud is helpful. Such film can be formed by applying it as a slurry with a suitable wetting agent, such as alcohol, by a plating process, or by bonding a mixture of powdered disulfide and a resinous material under heat to the parts.

While a lubricating oil may be forced into the duct 36 after the exposed outer spaces in the stud have been filled with the varnish and permitted to solidify, the amount of filling of such spaces may be changed according to requirements and the use to which the stud is to be subjected. Obviously, if the stud is to be used as a part of a pivotal connection the surfaces of the stud should be kept free of varnish or other material which might resist relative movement between the parts. Where a molybdenum disulfide film is used less filling of the spaces between the parts occurs and less difficulty is usually encountered since the amount of material utilized ordinarily is less than with a resinous varnish containing material.

The nature and scope of the invention having been indicated and a particular embodiment having been described, what is claimed is:

1. A readily disconnectible pivot joint for machine construction capable of reassembly without the necessity of replacing parts and provided with an expansible precision stud, and two machine elements formed with openings, one larger than the other, within the smaller of which the stud is expanded to provide a gripping mounting for the stud and within the larger of which the stud is rotatable, said stud having
   (a) an external finished cylindrical surface,
   (b) an axially threaded bore, the threaded portion of which extends within limits formed between planes defined by the outside faces of the machine elements, and
   (c) a slit extending throughout the length of the external surface of the stud to enable its expansion in diameter, in combination with
   (d) a screw having a conical head engaging the bore of the stud to provide a single ring of contact with the bore of the stud and located also between the outside faces of the machine elements, and
   (e) a threaded portion of uniform diameter engaging the threaded bore of the stud to form identical successive rings of contact with the threads in the bore, the conical head being exposed at the end of the stud outside the threaded bore to cause the rings of contact between the bore and the threaded and head portions of the screw when turned into the stud to wedge apart and support uniformly the threaded bore in the stud against the opening in the mounting element with a gripping engagement by the stud and to expand the stud to the same extent within the opening of the rotatable element as within the mounting element and to form a bearing with predetermined clearance without flaring permanently the ends of the stud.

2. A readily disconnectible pivot joint as in claim 1, in which
   (f) there is an identical conically headed screw, the larger diameter on the head of which is expose at the other end of the stud to expand the stud uniformly throughout its length when both screws are turned simultaneously in opposite directions.

3. A readily disconnectible pivot joint as in claim 1, in which
   (g) the threaded portions of the stud and screw change their manner of engagement to provide support for the external surface of the stud as the screw is turned into the stud.

4. A readily disconnectible pivot joint, as in claim 1, in which
   (h) the stud is provided at its end having the screw head with an internal conical surface of greater angle with respect to the axis of the stud than is formed by the conical head of the screw and the axis of the stud to prevent formation of a ring of contact outside the limits of the machine elements.

5. A readily disconnectible pivot joint, as in claim 4, in which
   (i) a solidified friction reducing material is disposed between the head of the screw and the internal conical surface of the stud to seal the space between them and to insure easy removal of the screw.

6. An expansible precision stud capable of disassembly and reassembly in machine elements formed with openings, one larger than the other to provide a gripping mounting within the smaller and a rotatable bearing within the larger, said stud having
   (a) an external finished cylindrical surface,
   (b) an axial threaded bore, and
   (c) a slit extending throughout the length of its external surface to enable expansion in diameter, in combination with
   (d) a screw having a conical head engaging the bore of the stud to provide a single ring of contact therewith and located also between the limits of the machine elements, and
   (e) a threaded portion of uniform diameter engaging the threaded bore of the stud to form identical successive rings of contact with the threads in the bore, the conical head being engaged in the end of the stud outside the threaded bore with a single ring of contact within the limits of the machine elements to enable the screw when turned into the stud to be tensioned between its threaded end and its conical head and to cause the rings of contact between the threaded portion and the head of the screw, on the one hand, and the bore, on the other hand, to wedge apart uniformly the bore in the stud while expanding it and to support the stud against collapse either in gripping or providing a bearing in the machine elements, thus avoiding concentrated strain on the stud without flaring its ends permanently.

7. An expansible precision stud capable of disassembly and reassembly in machine elements formed with openings, one intermediate one between two others forming a rotatable bearing of larger diameter than the other outside two, said stud having
   (a) an external finished cylindrical surface,
   (b) an axially threaded bore and a pair of conical recesses at the end of the bore, and
   (c) a slit extending throughout the length of its external surface to enable expansion in diameter, in combination with
   (d) two conical headed screws, one engaged at either end of the stud with successive rings of contact with the threaded bore to enable the screws when turned in opposite directions by equal amounts to cause their heads to engage the recesses with a single ring of contact for each to wedge apart the conical recesses of the stud into gripping engagement with the two machine elements and the rings of contact between the threads and the heads of the screws, on one hand, and the bore, on the other hand, to support uniformly against collapse the portion of the stud engaging the bearing of the intermediate element without permanently flaring the ends of the stud.

References Cited by the Examiner
UNITED STATES PATENTS

| 54,113 | 4/1866 | Clark | 85—77 |
| 1,443,534 | 1/1923 | Hoblit | 308—2 |
| 2,533,748 | 12/1950 | Weissert | 151—19 X |

FRANK L. ABBOTT, *Primary Examiner.*

RICHARD W. COOKE, JACOB L. NACKENOFF,
*Examiners.*